Aug. 11, 1953 N. O. CLARK 2,648,751
TRANSFORMER
Filed April 27, 1951 2 Sheets-Sheet 1

INVENTOR.
NELSON O. CLARK
BY
*Paul M Klein*
ATTORNEY

Aug. 11, 1953  N. O. CLARK  2,648,751
TRANSFORMER
Filed April 27, 1951  2 Sheets-Sheet 2

INVENTOR.
NELSON O. CLARK
BY
ATTORNEY

Patented Aug. 11, 1953

2,648,751

UNITED STATES PATENT OFFICE 2,648,751

TRANSFORMER

Nelson O. Clark, Winthrop, Mass.

Application April 27, 1951, Serial No. 223,421

10 Claims. (Cl. 219—12)

This invention relates broadly to soldering, heating or welding transformers, and especially to transformers adapted for quantity production of relatively small articles, such as armatures, coils, radio parts, electronic and other devices.

One of the principal objects of this invention is the provision of a simple, relatively inexpensive and readily produceable apparatus of that kind, wherein rigid, individually adjustable electrode holders are employed for the support of electrodes rendered adjustable in respect to these holders, and wherein each of the electrodes is provided with an individual heating element adapted to keep them at a sufficient temperature to render fluid soldering flux applied to the electrodes, thereby assuring these electrodes to remain always clean and ready for instant use.

Another object of this invention is to provide in a soldering, heating or welding transformer, specifically designed clamping blocks or jaws at the termini of the transformer secondary and within which jaws are revolubly mounted, axially movable electrode holders so that the latter are rendered adjustable transversely in respect to the termini of said secondary, and wherein in each electrode holder is revolubly mounted an axially adjustable, electrically heatable electrode, and wherein with the body of the transformer there is associated a work support adjustable relative to the electrodes.

A more specific object of this invention is the provision of a soldering or welding transformer, wherein is employed a base upon which is supported a laminated core forming the transformer body, said core having two adjacent spare-outs interposed by a central core element and about which central element is wound a primary of the transformer, and insulated from the primary is a single-turn secondary passing about the primary, and at each of the termini of the secondary there being provided a set of clamping jaws consisting of a lower fixed member secured through the core to the base and a detachable member adjustable relative to said fixed member, and wherein in both of these members there is provided a guideway for the reception of an electrode holder or electrode support, the latter being preferably rotatable within the guideway and adjustable axially and therefore transversely to the terminus or termini of the secondary, and in which electrode holders are adjustably mounted heated electrodes beneath which there is associated with the transformer body a work table adjustable relative to the electrodes.

The foregoing and still other objects and advantages of the present invention will become more fully apparent from the ensuing description, in conjunction with the accompanying drawings showing the presently preferred form of the device, and wherein.

Figure 1:
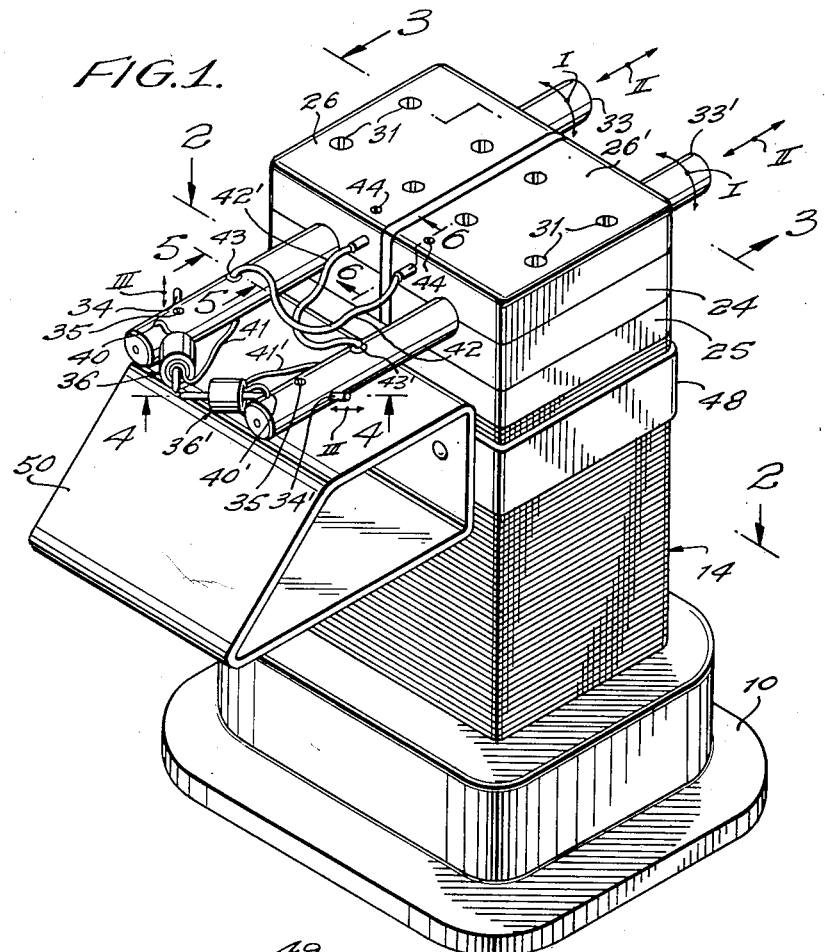
Fig. 1 is a perspective view of a soldering or welding transformer in accordance with the present invention.

As stated, the device is preferably provided with a base 10 which is hollow as at 11 for the reception of wire connections for the primary, as broadly indicated at 12. A bottom cover member 13 preferably closes the space housing wire connection 12. Mounted upon the base is a laminated core 14 having two adjacent spareouts 15 and a central core element 16 about which is wound the primary 17. A layer of insulation 18 is placed about the primary to separate the latter from a single-turn secondary 19, which is again insulated by an outer layer 20 from core 14. Insulating layer 18 extends at 21 between the termini 22 of the secondary, said termini being bent outwardly and being lodged within suitable recesses provided in clamping jaws 23. Each set of these clamping jaws comprises lower fixed members 24 which rest upon insulation 25, supported by core 14, and adjustable top members 26 and 26'. Fixed members 24 are securely united with the base through bolts 27 which are insulated from members 24 as at 28 and from the base as at 29. Adjustable members 26, 26' are separated from one another by central insulation 30 and are adjustably held against fixed members 24 by means of bolts or screws 31. Both jaw members of each set are preferably provided with semi-cylindrical guideways 32 for the reception of electrode holders 33, 33' which are adapted for both rotation and axial adjustment and thus for transverse adjustment relative to the termini of secondary 19. The rotary adjustment of electrode holders or rods 33, 33' is indicated by double arrows I, and their axial adjustment by arrows II.

Figure 4:
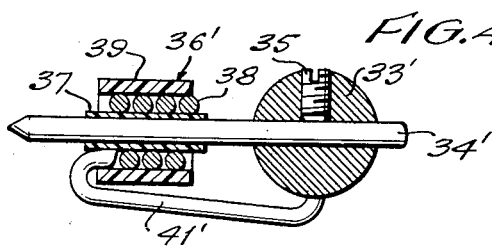
Fig. 4 is a detail section taken approximately along line 4—4 of Fig. 1.
Figure 6:
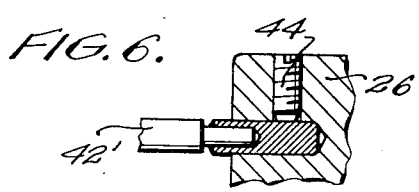
Fig. 6 is a detail sectional view taken approximately along line 6—6 of Fig. 1.

In electrode supporting rods 33, 33' are operatively mounted electrodes 34, 34' which are adjustable axially as indicated by arrows III and may be also rotated within the rods and are adapted to be held in their adjusted position by suitable set screws 35. Each of the electrodes, which are preferably made from highly heat resistant metal such as molybdenum or tungsten, are provided with individual resistance heaters 36 and 36'. The structure of these heaters comprises a relatively thin insulating tube 37 slipped over the electrode, a heating element 38 wound about the tube, and an insulating cover 39 placed over the heating element, as clearly seen in Fig. 4. One terminus of each heating element 38 is directly connected with its respective electrode supports 33, 33', as indicated at 40 and 40', while the other terminus is connected by means of insulated wires 41, 41' and 42, 42' to the opposite upper clamping jaw members 26' and 26, respectively. Thus, as will be observed from Fig. 1, the heating element of right-hand heater 36' is connected by lead 41' through an insulating bushing 43' mounted in electrode holder 33' with lead 42', and lead 42' is removably associated with adjustable jaw member 26 at the left-hand side of the transformer. Similarly the heating element of left-hand heater 36 is connected by lead 41 through bushing 43 in electrode holder 33 with lead 42, the latter being removably connected with right-hand adjustable jaw member 26'. The ends of leads 42 and 42' are preferably held against displacement by suitable set screws 44 as clearly seen in Figs. 1 and 6.

Figure 5:
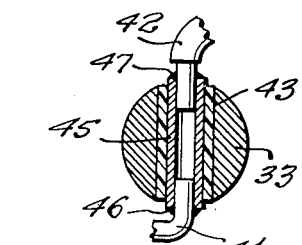
Fig. 5 is a section taken approximately along line 5—5 of Fig. 1.

The arrangement of insulating bushing 43 in electrode holder 33 is shown in greater detail in Fig. 5. From that figure it will be seen that lead 41 is connected with lead 42 by means of a tubing 45 which is lodged in insulating bushing 43 and to which tubing the ends of leads 41 and 42 are fixedly secured by soldering or otherwise, as indicated at 46 and 47, respectively.

Upon effecting the above-described electric connections for the heating elements the latter are energized and heat electrodes 34 and 34' sufficiently to keep whatever soldering flux is applied to the electrodes in a liquid state. By keeping the electrode tips continuously covered with a liquid soldering flux, these tips are kept from oxidizing and thus are always ready for effective soldering or heating operations. Due also to the fact that the soldering flux is always kept in liquid form by the heat, articles to be soldered are automatically supplied with the required amount of flux to assure adherence of solder to the parts to be treated. Obviously, for welding operations by the transformer the electrodes are changed and the heaters are dispensed with.

Figure 2:
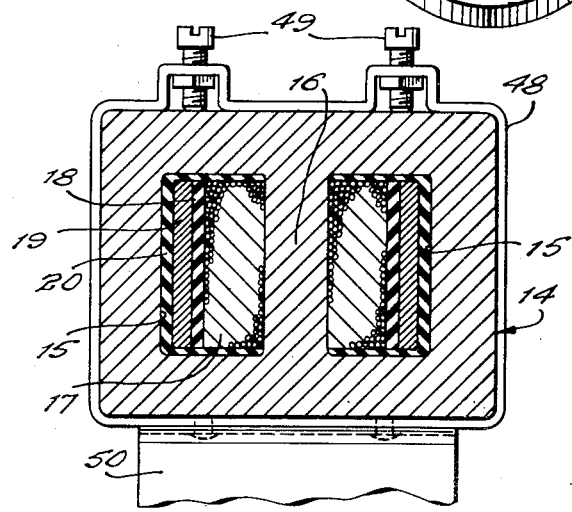
Fig. 2 is a section taken approximately along line 2—2 of Fig. 1.
Figure 3:
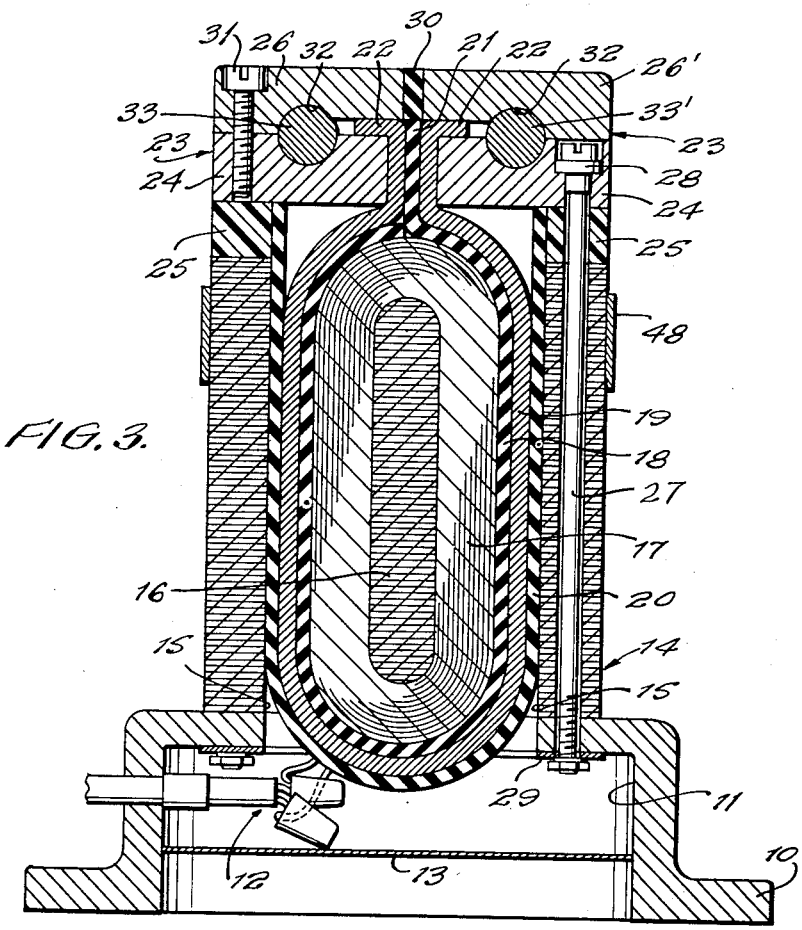
Fig. 3 is a vertical cross section taken approximately along line 3—3 of Fig. 1.

Removably associated with the transformer body is an adjustable frame 48, which may be set at any desired height in respect to the body by means of set screws 49, see Fig. 2. From frame 48 extends a work support 50, which latter may be adjusted by way of the frame in respect to the tip of electrodes 34, 34'. The shape of the work support obviously may be altered when different articles are to be handled.

While in the foregoing a specific construction of a soldering or welding transformer is described, it is readily obvious that when the device is to be employed in connection with the manufacture of different articles its construction and arrangement will be subjected to changes both in shape as well as in the disposition of its different constituents, such changes being deemed to reside within the general scope of the present invention, as defined in the annexed claims.

What is claimed as new is:

1. In a device for the purpose indicated, a base, a core, a primary within the core, and a single-turn secondary compassing the primary and having divergent termini, each of the termini being connected with a set of superimposed lower and upper clamping jaws, a pair of electrode supporting bars revolubly mounted in and being axially adjustable and fixedly holdable by their respective set of jaws, electrodes adjustable and fixedly holdable relative to said bars, an electric heating element for each electrode, and an adjustable work rest disposed beneath the electrodes.

2. In a device for the purpose indicated, a transformer structure having a single-turn secondary, the combination with the termini of said secondary, of longitudinally adjustable and rotatable electrode-carrying members, one for each electrode, each member having a heated electrode adjustable, revoluble and fixedly holdable in respect to said member.

3. In a device as per claim 2, and a work support operatively associated with said structure and being adjustable relative to the electrodes of both members.

4. In a device for the purposes indicated, a transformer structure comprising a base, a laminated core having spare-outs and a central element between them, a primary wound about that central element, a single-turn secondary insulated from and compassing said primary, a pair of clamping blocks, one for each terminus of the secondary, superimposed above said core and being insulated from one another and from that core, each of the blocks comprising a fixed lower member held against said base, and an upper member adjustable relative to the fixed member, electrode-supporting bars operatively mounted between the lower and upper members and being adapted for axial and rotary adjustment relative to said clamping blocks, electrodes operatively held in said bars and being adapted for axial and rotary adjustment in respect to said bars, heating elements for said electrodes, and a work rest operatively associated with said core and being adjustable relative to said electrodes.

5. In a device as in claim 4, said heating elements for the electrodes being insulated from the latter, one terminus of the heating element for each electrode being electrically connected with the bar carrying that electrode, the other terminus of the heating element being removably connected with the clamping block holding the bar carrying the other electrode.

6. In a soldering transformer, the combination with the terminals of the secondary, of rigid, rotatably lodged and axially adjustable electrode supports and adapted for movement transversely in respect to the terminals.

7. In a soldering transformer as in claim 6, and electrodes axially and revolubly adjustable in said supports, and heating elements provided for the electrodes.

8. In a soldering transformer, the combination with the terminals of the transformer secondary, of rigid, revoluble electrode supports adjustable transversely in respect to these terminals, revoluble electrodes adjustable axially in said supports, heating elements for the electrodes, and a work support adjustable relative to these electrodes.

9. In a soldering transformer including fixed and movable clamping jaws for adjustably accommodating rigid electrode holders and which clamping jaws constitute the termini of the transformer secondary, the combination with the transformer body, of a work support adjustable relative to said body and in respect to said electrode holders.

10. The combination with a soldering transformer or the like including a core, two sets of fixed and adjustable clamping jaws for accommodating rigid electrode holders movable relative to and capable of being fixedly positioned within said jaws, the latter forming the termini of the transformer secondary, the combination with the core of the transformer, of a work support adjustable relative to said core and in respect to said rigid electrode holders.

NELSON O. CLARK.

References Cited in the file of this patent

UNITED STATES PATENTS

| Number | Name | Date |
|---|---|---|
| 1,372,634 | Thornton | Mar. 22, 1921 |
| 1,542,664 | Brenzinger | June 16, 1925 |
| 2,448,865 | Crombach | Sept. 7, 1948 |
| 2,488,101 | Ross | Nov. 15, 1949 |
| 2,550,748 | Woltz | May 1, 1951 |